United States Patent [19]

Ramsey et al.

[11] Patent Number: 4,608,489

[45] Date of Patent: Aug. 26, 1986

[54] METHOD AND APPARATUS FOR DYNAMICALLY SEGMENTING A BAR CODE

[75] Inventors: David A. Ramsey; Clair F. Rohe; Thomas E. Sawicki, all of Charlotte, N.C.

[73] Assignee: International Business Machines Corporation, Armonk, N.Y.

[21] Appl. No.: 616,822

[22] Filed: Jun. 4, 1984

[51] Int. Cl.[4] .............................................. G06K 7/10
[52] U.S. Cl. .................... 235/462; 235/463; 235/494
[58] Field of Search ...................... 235/462, 463, 494

[56] References Cited

U.S. PATENT DOCUMENTS

| | | | |
|---|---|---|---|
| 3,780,270 | 12/1973 | Faulkner et al. | 235/61.11 |
| 4,045,773 | 8/1977 | Kadota et al. | 340/146 |
| 4,175,693 | 11/1979 | Nakanishi et al. | 235/463 |
| 4,389,634 | 6/1983 | Nakamura | 382/11 |
| 4,408,121 | 10/1983 | Galatha | 235/494 |

OTHER PUBLICATIONS

IBM Technical Disclosure Bulletin, vol. 25, pp. 6074, 6076–6077, Apr. 1983.

*Primary Examiner*—Harold I. Pitts
*Attorney, Agent, or Firm*—Bell, Seltzer, Park & Gibson

[57] ABSTRACT

A method and apparatus are disclosed for reading a two-dimensional bar code having bars located nominally at predetermined pitch increments. The invention provides a method and apparatus for reading a two-dimensional bar code and dynamically segmenting it into individual bars on a real time basis, as it is read. The segmentation is done on a bar-to-bar basis, and may be adjusted for an individual bar as necessary. The method and apparatus locate the bar data, scan it, and create a profile vector having elements based upon the amount of image data in each scan. The vector is compared to a predetermined stored set of vector elements representing the likelihood that each scan line of image data contains bar image data. Those scan lines of image data corresponding to a bar image are sent to recognition logic and those scan lines of image data corresponding to a space are disregarded.

29 Claims, 7 Drawing Figures

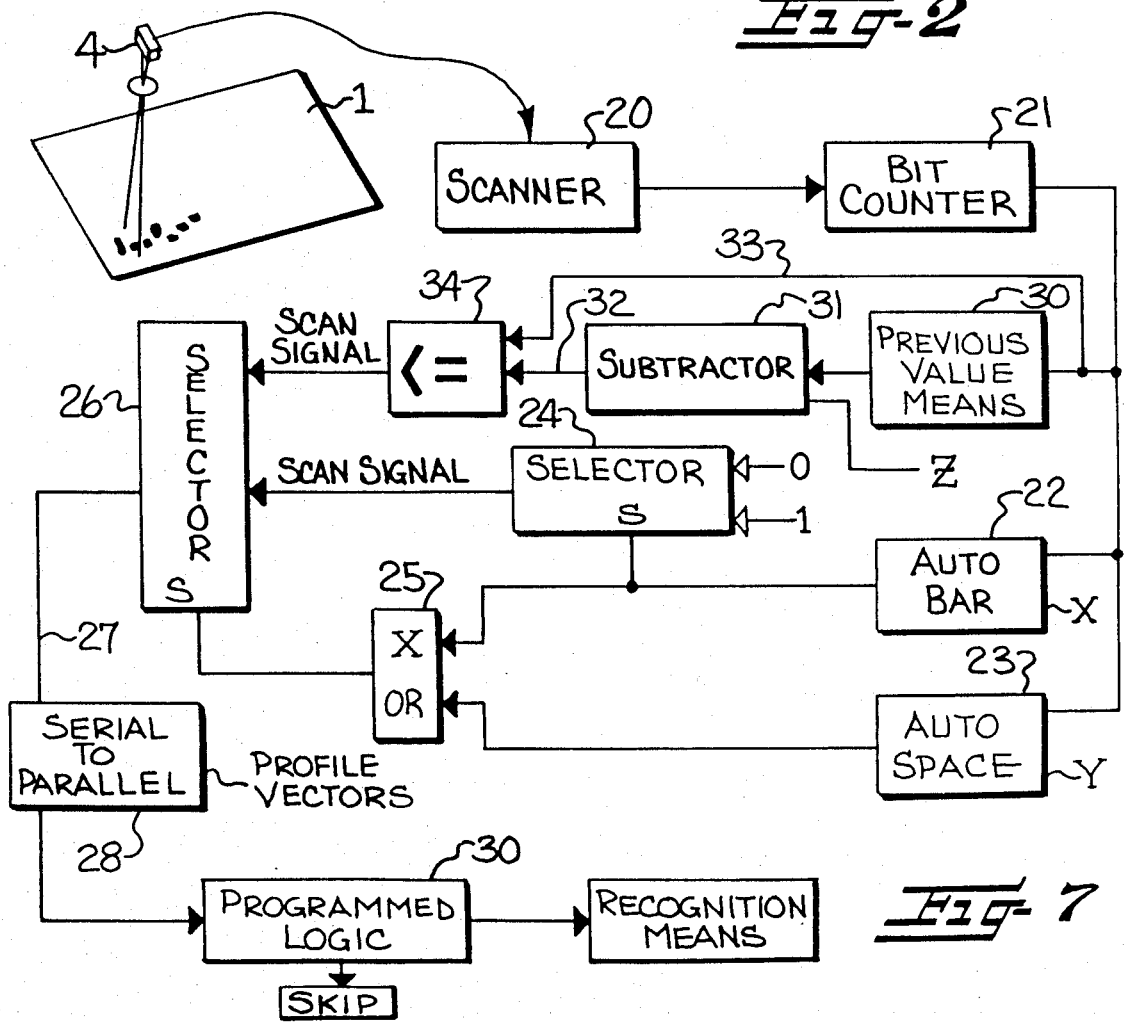

| IMAGE DATA TO RECOGNITION MEANS | SCAN NUMBER | SCAN LINES OF ELEMENTS OF IMAGE DATA |
|---|---|---|
| ——— SCAN SKIPPED ——— | 0001 | 01   6 012 456   2 45 |
| 456 01234567012345670123456 | 0002 | 456 01234567012345670123456 |
| 0123456701234567012345670123456 | 0003 | 0123456701234567012345670123456 |
| 0123456701234567012345670123456 | 0004 | 0123456701234567012345670123456 |
| 012345670123456701 345670123456 | 0005 | 012345670123456701 345670123456 |
|  | 0006 | 01 3 5     4   01 34567012345 |
| SKIP 4 | 0007 | 3 |
|  | 0008 |  |
|  | 0009 | 2 |
| 01234 | 0010 | 01234 |
| 01234 | 0011 | 01234 |
| 01234 | 0012 | 01234 |
| 0123 | 0013 | 0123 |
| SKIP 3 | 0014 | 3 |
|  | 0015 |  |
| 1234 | 0016 | 23 |
| 012345 | 0017 | 1234 |
| 012345 | 0018 | 012345 |
| 01234 | 0019 | 012345 |
| SKIP 3 | 0020 | 01234 |
|  | 0021 | 4 6 012   6 |
|  | 0022 | 45670123456701 |
| 2345670123456701 | 0023 | 2345670123456701 |
| 2345670123456701 | 0024 | 2345670123456701 |
| 3456701 34567 | 0025 | 234567012345 67 |
| 7  3  5 | 0026 | 3456701 34567 |
| SKIP 2 | 0027 | 7  3  5 |
|  | 0028 |  |
|  | 0029 | 4 |
| 012345 | 0030 | 012345 |
| 012345 | 0031 | 012345 |
| 012345 | 0032 | 012345 |
| 01234 | 0033 | 01234 |
| SKIP 3 | 0034 | 01234 |
|  | 0035 | 3 |
| 567012 | 0036 | 01 |
| 4567012 | 0037 | 567012 |
| 4567012 | 0038 | 4567012 |
| 456701 | 0039 | 4567012 |
| SKIP 2 | 0040 | 456701 |
|  | 0041 | 56701 |
| 23456 | 0042 | 4 6 |
| 23456 | 0043 | 23456 |
| 23456 | 0044 | 23456 |
| 234567 | 0045 | 23456 |
|  | 0046 | 234567 |

Fig-6     Fig-3

SCAN COUNTS

PROFILE VECTORS

METHOD AND APPARATUS FOR DYNAMICALLY SEGMENTING A BAR CODE

This invention relates to a system for optically scanning a bar code and processing the data obtained to more accurately identify the symbols comprising the bar code. More specifically, it relates to a method and apparatus for segmenting the bar code into individual bars for recognition by determining the most likely actual separation of bars located nominally at a fixed pitch.

BACKGROUND OF THE INVENTION

Various apparatus and methods for optically recognizing characters, including bar codes, have existed for many years. This invention concerns recognition of a bar code comprising a two-dimensional set of vertical bars of predetermined lengths that are nominally spaced at predetermined horizontal intervals. The space occupied by one bar plus the space between the adjacent bar is referred to as the bar pitch, and it is typically fixed. An example of such a bar code is disclosed in U.S. Pat. No. 4,408,121, which is incorporated herein by reference.

The bar code is "read" or deciphered by an optical scanner which converts the optical information, i.e. picture elements or Pels, into electrical data pulses that may be processed by a computer or the like. Since the two dimension bar code is particularly useful in marking bank checks, it is desirable to be able to read the code at high speed using typical bank check data processing equipment. However, the accuracy of high speed reading may be compromised due to irregularities in either the bar code itself or the equipment used to scan the bar code or both. For example, bar code errors may include irregular horizontal spacing between vertical bars, top to bottom skew, tilt, partial obliteration of one or more bars, and other stray marks in the vicinity of the bar.

The equipment used to decipher the bar code typically transports the document bearing the code, such as a bank check, through a field monitored by a scanner that discriminates between the individual bars and a contrasting background to generate scan lines of elements of image data representing either a bar image Pel or a space image Pel. The document usually passes through the scanner field at a high rate of speed that is coordinated to the rate at which the scanner generates the lines of image data and to the fixed bar pitch or the width of the spaces between the individual adjacent bars. Problems arise when documents move through the scanner field at different velocities, with a skewed orientation, or at a nonconstant velocity. This causes the bar code to be out of alignment with the scanner field, and the scanner may sense a nonconstant pitch, inducing errors.

SUMMARY OF THE INVENTION

This invention provides a method and apparatus for reading a two-dimensional bar code and dynamically segmenting it into individual bars on a real time basis as it is read. The segmentation is done on a bar-to-bar basis, and may be adjusted for an individual bar as necessary. Thus, it functions over a wide range of bar widths and bar spacings, provided the bars are printed at a nominally fixed pitch, and it accomodates variations within a single bar code, variations from one bar code to another bar code, and variations in different bar reading equipment without degrading accuracy.

The method and apparatus locate the bar data, including any starting symbol, and isolate it from the space or background data. This is accomplished by scanning the bar code and creating a profile vector or data word having elements based upon the amount of image data, i.e. the number of bar image pels, as opposed to space or background image pels, in each scan. The created vector is then compared with a stored set of vector models representing various bar image data location possibilities. The model matching the created vector defines how the scan image data is to be processed so that only those selected scan lines of image data corresponding to the best available bar image scan data are sent to the recognition logic. Those scan lines of image data corresponding to a space image scan or a mispositioned bar scan or noise are disregarded and do not go to the recognition logic. This is done on a bar-to-bar basis and compensates for the problems noted earlier. The method and apparatus may also be employed to locate and normalize a start position represented by a special field mark in the code, i.e. an oversized starting symbol, as well as to find individual bars for recognition.

Thus, it is an object of the present invention to provide a method and apparatus for accurately reading a two-dimensional bar code having bars located nominally at fixed pitch intervals, including any starting symbols.

It is a further object of the present invention to eliminate errors in deciphering a two-dimensional bar code that arise from variations in bar pitch or a mispositioned bar scan or noise.

It is a still further object of the present invention to select the image data most accurately representing the bar code and to disregard other image data and space scan data.

It is a still further object of the present invention to provide a method and apparatus to dynamically segment a bar code on a real time basis as the bar code is scanned at high speed.

The method and apparatus of this invention is a system for reading a two-dimensional bar code having bars located nominally at predetermined pitch increments. The bar code is scanned at predetermined increments to produce lines of elements of image data or pels. Each data element is either a first or second state to reflect either a bar image or a space image. From the scan lines of image data, a profile vector is generated having individual data elements (binary scan signals) which represent the likelihood that a respective scan line of image data contains bar image data or space image data. A selected number of scan lines containing bar image data are transferred to the recognition means, and those not meeting the predetermined criteria, i.e., those likely representing a space image or bar image errors, are disregarded and not sent to the recognition means.

The selection of scan lines of image data to be transferred to the recognition means is preferably accomplished by the use of a look-up table accessed by the profile vector. The look-up table includes stored sets of vector models which define which of the scan lines of image data comprising the presented vector contain the most reliable bar image data. After selected scan lines of image data have been transferred to the recognition means, a succeeding vector is constructed from the succeeding binary scan signals and the process is repeated as often as required until the end of the bar code is reached.

DESCRIPTION OF THE DRAWINGS

FIG. 1 is a schematic block diagram illustrating a system for reading a two-dimensional bar code according to the present invention.

FIG. 2 is an enlarged illustration of a representative two-dimensional bar code.

FIG. 3 illustrates typical scan lines of elements of image data produced by scanning the two-dimensional bar code of FIG. 2.

FIG. 6 illustrates those scan lines of image data from FIG. 3 transferred to recognition means and those scan lines disregarded or skipped.

FIG. 7 is a schematic block diagram illustrating a logic system for implementation of the present invention.

DESCRIPTION OF THE INVENTION

Figure 4:
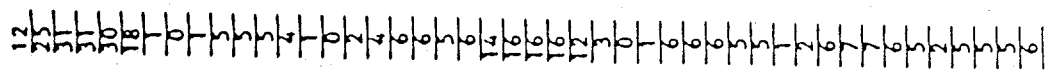
FIG. 4 illustrates the scan counts corresponding to the scan lines of image data of FIG. 3.

Referring to FIGS. 1 and 2, a record or document 1, such as a bank check, includes a two-dimensional bar code 2 at a predetermined location, such as the lower left corner. An optical scanner 3, as is well known in the art, scans that portion of the document intended to display the bar code with optically sensitive apparatus 4 that can distinguish between a bar and a space, or background. In the present invention, the code is vertically scanned to detect image data of either a first or a second state to provide a digitized data stream reflecting either a bar image scan or a space image scan.

The digital data generated by the scanner is provided to the profile generation and transfer means 5 and forms the basis for the generation of a profile vector element representing the likelihood that a scan line of image data contains bar image data. Those scan lines meeting predetermined criteria are deemed most representative of a bar image scan and are transferred to the recognition means 6, and those scan lines not meeting the predetermined criteria are deemed less likely to represent a bar image scan and are disregarded or skipped 7 as representing a space image scan, even though they may contain a significant number of bits of bar image data.

FIG. 2 illustrates an enlargement of a typical two-dimensional bar code comprising a number of bars located nominally at predetermined pitch increments. Each bar has a predetermined length, position and orientation representative of the information to be conveyed. The bars are localized in a predetermined zone 10 that corresponds to the field read by the scanner 3, 4. The bars are printed to contrast with the background 11 so that the scanner may discriminate between them. The bars 13–19 are printed at a nominally fixed pitch, meaning that the distance 12 of a bar width and the adjacent bar-to-bar space is nominally fixed.

A starting symbol 13, which is longer than the other symbols, is typically provided at the edge of the bar code that first enters the field of the scanner. Such a starting symbol identifies the first element of a bar code, assists in defining the boundaries of the zone that contains the bar code, initiates the collection of data representing the profile of the bar image data, and assists in normalizing the shape, size and location of the bars comprising the bar code.

Errors in printing the bar code may include irregular horizontal spacing between vertical bars, top to bottom skew, tilt, partial obliteration of one or more of the bars, and stray marks in the vicinity of the bar. These errors are illustrated by way of example in FIG. 2. By comparison, perfectly formed bars would be illustrated as regularly spaced and parallel rectangles with straight sides and right angle corners. An example of a bar code suitable for use with the present invention is disclosed in U.S. Pat. No. 4,408,121.

Referring to FIG. 3, scan lines numbered 0001 through 0046 correspond to the elements of image data generated by scanning the bar code of FIG. 2. These scan lines are typical of the information that would be provided to the profile generation and transfer means 5. Those areas for which the scanner detected a bar image are represented by the presence of a digit 0 through 7, and those areas representing a space image are blank. The scan lines are generated as the bar code passes through the scanner field.

Referring to FIG. 4, for each scan line of image data generated by the scanner, a count is accumulated reflecting the number of bits of bar image data, i.e. picture elements representing bar data or bar pels, as represented by one of the digits 0 through 7. For instance, reading vertically downward from FIG. 3 to FIG. 4, for scan line number 0001, 12 bar image pels were detected, and for scan number 0002, 25 bar image pels were detected. The scan counts are generated as the scan lines are presented to the counter means.

The count of the number of bar image pels for each scan line is provided to decision logic to determine the likelihood that the associated scan line of image data represents a bar image scan or a space image scan. (Reference to a space image scan includes an image scan containing insufficient bar image data to reliably be deemed to represent bar image data.) According to predeterminable criteria, a binary scan signal, i.e. a 1 or a 0, is assigned and these signals are sequentially stored in a register in a location which corresponds to its respective scan line of image data. The register thus represents a profile of the bar image data from the scans. For instance, referring to FIG. 5 and reading vertically downward from FIGS. 3 and 4, scan line number 0003 is assigned a 1 because its count of 31 bar image pels represents a bar image scan, and scan line number 0016 is assigned a 0 because its count of 2 bar image pels represents a space image scan. A more detailed description of the decision logic for generation of the profile is provided in connection with FIG. 7.

Using the profile, a profile vector comprising the eleven sequential binary scan signals for one bar pitch (i.e., one nominal bar width plus one nominal bar space) plus one additional bar width is designated. Based upon the nominally known pitch, this comprises the adjacent binary scan signals for four bar image scans plus three space image scans plus four bar image scans, for a total of eleven scans, and this is designated profile vector A in FIG. 5.

The designated profile vector is compared to a programmable logic array having predetermined criteria, as may be contained in a look-up table. According to the present invention, the first four scan lines of image data corresponding to the first four binary scan signals of the profile vector element are assumed to represent bar image data, and the programmable logic array will provide an output indicating how many of the succeeding scan lines following the first four are disregarded or skipped to get to the next scan lines likely to represent bar image data. For instance, for profile vector A the first four scan lines are designated as representing image data, and the next four scan lines are disregarded to get to the following scan lines of data most likely to represent the following bar image scan, namely the last three binary scan signals of profile vector A.

Those scan lines of image data meeting the predetermined criteria are deemed representative of a bar image scan and are presented to the recognition means. Those scan lines of image data not meeting the predetermined criteria are deemed representative of a space image scan and are disregarded. In the present example, scan lines 0002–0005 are presented to the recognition logic and scan lines 0006–0009 are disregarded. Scan line 0001 is disregarded as the initial scan line of image data as a part of the start bar or first bar normalization process. This may be done in any manner well known in the art, and is typically tailored to the characteristics of each start bar for each bar code.

Figure 5:
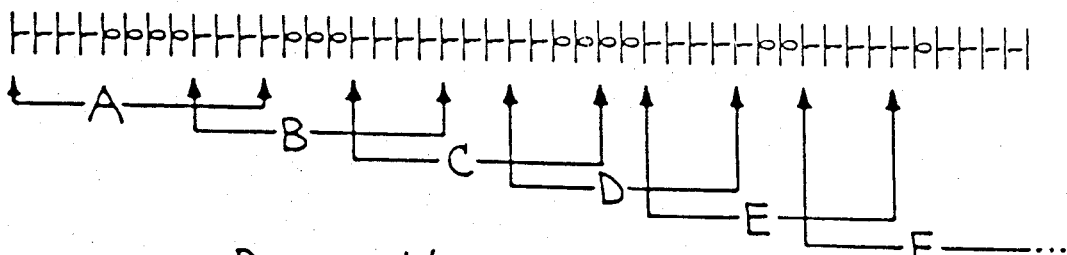
FIG. 5 illustrates the binary scan signals comprising the profile vectors corresponding to the scan counts of FIG. 4.

After the scan lines of elements of image data and space data have been transferred or skipped, a second eleven element profile vector is constructed to the original complement of one bar pitch plus one additional bar width, with the retained elements from the preceding profile vector element comprising the initial elements of the succeeding profile vector, as profile vector B illustrates in FIG. 5. Specifically, scan lines 0002–0005 were deemed representative of a bar image scan and were transferred to recognition means, scan lines 0006–0009 were deemed representative of a space image scan and were disregarded, and scan lines 0010–0012 were retained to complete the profile vector complement of one bar pitch plus one additional bar width. Profile vector B therefore begins with scan line 0010 and extends through and including scan line 0020.

Profile vector B is presented to the programmed logic array as described earlier. The first four scan lines 0010–0013 are automatically designated representative of bar image data and are transferred to the recognition means, and scan lines 0014–0016 are disregarded as being representative of a space image scan. Scan lines 0017–0020 are retained for construction of profile vector element C. Successive profile vectors C, D, E, F, etc. are constructed and compared to the predetermined criteria as required until the end of the bar code has been reached. If the profile vector element does not meet any of the predetermined criteria, the decision on the number of lines of image data to be disregarded defaults to the nominal bar pitch, which in the present example is three lines.

The following table identifies those scan lines to be disregarded or skipped for each profile vector presented to the programmed logic array:

| Profile Vector Element | Disregarded Scan Lines |
| --- | --- |
| A | 0006–0009 |
| B | 0014–0016 |
| C | 0021–0023 |
| D | 0028–0029 |
| E | 0034–0036 |
| F | 0041–0042 |

To initiate the generation of a profile of the scan image date, as illustrated in FIG. 5, the starting symbol is recognized and normalized. It is recognized by first recognizing a scan that is likely to include image data rather than noise or background data, and then determining whether the image data represents a bar image or a starting symbol. Specifically, the preferred embodiment looks first for an enabling scan containing at least 14 bar image pels, followed by at least one of the three succeeding scans having at least 24 bar image pels. Having confirmed the presence of a start bar, its width is determined and the collection of the binary scan signals to generate the profile of the image data is initiated. The start bar width is defined by incrementing a start bar counter by one step for the enabling scan and one step for each of the succeeding scans having at least 20 bar image pels. The collection of binary scan signals to form the profile of the image data begins with the enabling scan for the start bar.

The number of steps in the start bar counter is used to select which binary scan signal shall be used to initiate the first profile vector. Specifically, one binary scan signal is bypassed for every other step counted beyond four. If the start bar counter has five or six counts, one line of image data is skipped and the profile begins with scan number 0002. If the count is seven or eight, two lines of image data are skipped and the profile begins with scan number 0003. In the illustrated embodiment, the enabling scan is scan number 0002, because it is the first scan line having at least 14 bar image pels, and scan numbers 0003–0005 are the succeeding scan lines having at least 20 bar image pels. Thus, the start bar comprises scan lines 0002–0005, with scan number 0001 being skipped, and the first profile vector begins with scan number 0002.

Referring to FIG. 7, the digitized data stream of scan lines of elements of image data from the scanner 20 is provided in timed sequence to the bit counter 21 to count the number of bar image pels detected in the scan line presented. This information represents the scan counts identified in FIG. 4. The scan count is provided to two fixed value comparators 22, 23 and register 30. The first comparator 22 determines whether the scan count exceeds a predetermined value X, as might happen for a start bar, and if so, its output signal represents that a scan line contains sufficient bar image pels to be designated as a bar image scan. Similarly, the second comparator 23 determines whether the scan count is less than a predetermined value Y, which identifies the scan line as having insufficient bar image pels to constitute a bar image scan, and it is designated as a space image scan, even though it may contain several bar image elements. The values X and Y may be set as necessary or desirable to, for instance, automatically identify a start symbol or eliminate noise.

The output of comparator 22 is provided to selector 24 and exclusive OR gate 25. Selector 24 presents the appropriate scan signal logic 1 to selector 26 and the output of the exclusive OR gate 25 causes selector 26 to gate the logic 1 signal through to represent the binary scan signal 1 on line 27 for the associated scan line.

The output of comparator 23 is provided to exclusive OR gate 25. In the absence of an output from comparator 22, selector 24 provides a logic 0 which is gated through the selector 26 to appear as a logic 0 on line 27, representing a space image scan.

The output from bit counter 21 is also provided to the previous value register 30. If neither of the criteria for the two comparators 22, 23 are satisfied, the binary scan signal for the scan line under consideration is provided by comparing the present scan count to the scan count for an adjacent scan line. Specifically, the scan count from the previous scan line is stored in previous value means register 30, and a constant Z is subtracted from this previous scan count in substractor 31 to provide an adjusted scan count on line 32. The adjusted count is compared to the current scan count provided via line 33 to comparator 34. The output of comparator 34 is a logic 1 if the current scan count is equal to or greater than the adjusted previous scan count, and it is a logic 0 otherwise. This scan signal is provided to selector 26 and is gated through to line 27 in the absence of a signal from exclusive OR gate 25. Each of the scan counts are sequentially processed in this manner and may be provided to a serial to parallel shift register 28 to form the various profile vectors A-F as illustrated in FIG. 5.

The profile vectors, as completed, are fed in parallel to the programmed logic 30. Those scan lines meeting predetermined criteria representative of a bar image scan are presented to the recognition logic and those scan lines not meeting the predetermined criteria are disregarded. This is accomplished as described earlier by providing the scan lines of image data representing the first portion of the profile vector to the recognition logic, disregarding those scan lines of image data from the middle portion of the profile vector, and utilizing the scan lines of data from the last portion of the profile vector to construct the initial portion of the following profile vector.

The present invention may be implemented in real time on a bar-to-bar basis which adjusts for gradual changes in the bar code as the document is scanned. Advantages include the ability to update the bar code segmentation on an individual bar-to-bar basis as required, the ability to function over a wide range of bar widths and lengths, the ability to accommodate automatic scanning equipment where the document transport speeds vary from machine to machine, the ability to recognize a starting symbol and the ability to easily modify the decoding information utilized in the look-up tables, programmed logic, or automatic bar and space comparators.

Those skilled in the art will recognize that various modifications, additions and deletions can be made to the particular embodiment shown having had the benefit of the present teachings without departing from the scope of the invention.

That which is claimed is:

1. In a system for reading a two-dimensional bar code having bars located nominally at predetermined pitch increments, a method for processing bar image data comprising:
   scanning the bar code at predetermined increments to produce scan lines of elements of image data of either a first or a second state to reflect either a bar image scan or a space image scan;
   generating from the scan lines of image data a profile vector having elements representing the likelihood that each scan line of image data contains bar image data; and
   transferring to recognition means only those scan lines of image data corresponding to generated profile vector elements meeting predetermined criteria representative of a bar image scan, and disregarding those scan lines of image data corresponding to generated profile vector elements not meeting the predetermined criteria.

2. The method of claim 1 wherein the step of scanning the bar code further comprises scanning a starting symbol at a predetermined location with respect to the bar code.

3. The method of claim 1 wherein the step of scanning the bar code comprises scanning at nominally fixed pitch increments that are submultiples of the predetermined pitch to produce successive scan lines of image data for each bar pitch.

4. The method of claim 1 wherein the image element first state comprises a picture element of a high color density and the image element of a second state comprises a picture element of a low color density and wherein the step of scanning the bar code comprises producing scan lines of elements of image data representing image elements of either a first or a second color density.

5. The method of claim 1 wherein the step of generating a profile vector includes counting the number of elements of image data of a first state in each scan line.

6. The method of claim 5 wherein the step of generating a profile vector element includes storing the count of the number of elements of image data in a location corresponding to the scan line it represents.

7. The method of claim 5 wherein the step of generating a profile vector further comprises comparing each count of the number of elements of image data of a first state in each scan line to predeterminable criteria to determine whether each associated scan line of image data represents a bar image scan or a space image scan, and generating a binary scan signal representative thereof for each scan line.

8. The method of claim 1 wherein the step of transferring the scan lines further comprises transferring each scan line in its respective order and position with respect to other scan lines.

9. In a system for reading a two-dimensional bar code having bars located nominally at predetermined pitch increments, a method for generating and processing bar image data comprising the steps of:
   scanning the bar code at predetermined increments in a direction parallel to the bar longitudinal axis to produce scan lines of elements of image data for each bar pitch of either a first or a second state to reflect either a bar image scan or a space image scan;
   counting the number of elements of image data of a first state for each scan line;
   comparing each count to predeterminable criteria to determine whether each associated scan line of image data represents a bar image scan or a space image scan and generating a binary scan signal representative thereof for each scan line;
   generating a scan profile vector by sequentially accumulating the binary scan signals in units of one bar pitch plus one bar width; and
   comparing the generated scan profile vector to predetermined criteria and delivering selected ones of the associated scan lines of image data for further processing and disregarding selected others of the associated scan lines of image data based upon said comparison.

10. The method of claim 9 wherein the step of scanning the bar code comprises scanning at increments that are submultiples of the predetermined pitch.

11. The method of claim 9 wherein the step of counting the number of elements of image data of a first state further comprises storing each of said counts.

12. The method of claim 9 wherein the step of comparing each count to predeterminable criteria comprises
comparing each count to a first value indicative of a bar image scan, a second value exclusive of said first value indicative of a space image scan, and a third value exclusive of the first and second values, the third value being a function of the count of the number of elements of image data of a first state for an adjacent scan line.

13. The method of claim 12 wherein the step of comparing the stored count with a first value indicative of a bar image scan comprises:
comparing the stored count with a first predetermined minimum number of image data elements of a first state to identify a bar image scan; and
comparing the stored count with a second, higher predetermined minimum number of image data elements of a first state to identify a starting symbol scan.

14. The method of claim 9 wherein the step of sequentially scanning the bar code comprises scanning at least a portion of one bar at a time.

15. The method of claim 9 wherein all of the steps are performed on a substantially real time basis as the scan lines of image data are produced.

16. The method of claim 9 wherein the step of delivering selected ones of the associated scan lines of image data comprises delivering about the initial one third of the scan lines of image data, and the step of disregarding selected others of the associated scan lines of image data comprises disregarding about the middle one third of the scan lines of image data.

17. The method of claim 9 further comprising the step of generating a successive scan vector by sequentially accumulating the binary scan signals remaining after delivering selected ones of the scan lines of image data and disregarding selected others of the scan lines of image data with the binary scan signals representing the next successive one bar pitch.

18. The method of claim 9 wherein all of the steps are repeated until a scan vector has been generated for substantially each bar in the bar code.

19. The method of claim 9 wherein the step of scanning the bar code further comprises normalizing the scan lines of image data with respect to a starting symbol.

20. In a system for reading a two-dimensional bar code having bars located nominally at predetermined pitch increments, apparatus for generating and processing bar image data comprising:
means for scanning the bar code at predetermined increments to produce scan lines of elements of image data of either a first or a second state to reflect either a bar image scan or a space image scan;
means for generating, from the scan lines of image data, a profile vector having elements representing the likelihood that each scan line of image data contains bar image data; and
means for transferring to recognition means only those scan lines of image data corresponding to generated profile vector elements meeting predetermined criteria representative of a bar image scan, and disregarding those scan lines of image data corresponding to generated profile vector elements not meeting the predetermined criteria.

21. The apparatus of claim 20 wherein said means for scanning the bar code comprises means for scanning the bar code in a direction parallel to the bar code longitudinal axis.

22. The apparatus of claim 20 wherein said means for scanning the bar code comprises means for scanning the bar code in increments that are sub-multiples of the bar pitch.

23. The apparatus of claim 20 wherein said means for generating a profile vector comprises:
means for counting the number of elements of image data of a first state in each scan line;
means for comparing each count for each scan line with predeterminable criteria to determine whether the associated scan line of image data represents a bar image scan or a space image scan, and for generating a binary scan signal representative thereof for each scan line; and
means for generating the scan profile vector by sequentially accumulating the binary scan signals in units of one bar pitch plus one bar width.

24. The apparatus of claim 23 wherein said means for comparing each count with predeterminable criteria includes:
first discriminatory test means for detecting a scan comprising primarily elements of a first state;
second discriminatory test means for detecting a scan comprising primarily elements of a second state; and
third discriminatory test means for determining whether an image scan not satisfying said first or second or discriminatory test means comprises primarily elements of a first or second state.

25. The apparatus of claim 24 wherein said third discriminatory test means comprises means for comparing the count of a selected scan line of image data with the count of an adjacent scan line of image data.

26. The apparatus of claim 20 wherein the means for transferring to recognition means comprises means for applying a first set of discriminatory tests to the generated profile vector to identify those scan lines of image data most likely to represent a bar image scan and those scan lines of image data most likely to represent a space image scan.

27. The apparatus of claim 20 further comprising means for recognizing a starting symbol.

28. The apparatus of claim 27 further comprising means for normalizing the scan lines of image data with respect to a starting symbol.

29. The apparatus of claim 28 wherein said means for normalizing the scan lines of image data comprises means for determining the approximate center of the starting symbol.

* * * * *